US010165254B2

(12) United States Patent
Drazic et al.

(10) Patent No.: US 10,165,254 B2
(45) Date of Patent: Dec. 25, 2018

(54) METHOD FOR OBTAINING LIGHT-FIELD DATA USING A NON-LIGHT-FIELD IMAGING DEVICE, CORRESPONDING DEVICE, COMPUTER PROGRAM PRODUCT AND NON-TRANSITORY COMPUTER-READABLE CARRIER MEDIUM (71) Applicant: THOMSON LICENSING, Issy les Moulineaux (FR)

(72) Inventors: Valter Drazic, Betton (FR); Benoit Vandame, Betton (FR); Arno Schubert, Chevaigne (FR)

(73) Assignee: INTERDIGITAL CE PATENT HOLDINGS (FR)

( * ) Notice: Subject to any disclaimer, the term of this patent is extended or adjusted under 35 U.S.C. 154(b) by 283 days.

(21) Appl. No.: 15/143,549

(22) Filed: Apr. 30, 2016

(65) Prior Publication Data
US 2016/0323557 A1 Nov. 3, 2016

(30) Foreign Application Priority Data
Apr. 30, 2015 (EP) .................... 15305661

(51) Int. Cl.
H04N 13/236 (2018.01)
H04N 5/232 (2006.01)
(Continued)

(52) U.S. Cl.
CPC ....... H04N 13/236 (2018.05); G06K 9/00671 (2013.01); G06K 9/4671 (2013.01);
(Continued)

(58) Field of Classification Search
CPC ... G06K 9/6211; G06T 7/0028; G06T 7/0044; G06T 5/002; G06T 2207/20101;
(Continued)

(56) References Cited
U.S. PATENT DOCUMENTS 8,259,161 B1 9/2012 Huang et al.
2011/0255775 A1 10/2011 McNamer et al.
(Continued)

FOREIGN PATENT DOCUMENTS

EP 2566150 3/2013
WO WO2013180192 12/2013
WO WO2014149403 9/2014

Primary Examiner — Luke D Ratcliffe
(74) Attorney, Agent, or Firm — Jack Schwartz & Associates, PLLC (57) ABSTRACT A method for obtaining light field data of a scene from a sequence of images of the scene, each image being captured at a different viewpoint using a non-light-field image capture device is described. The method includes obtaining a reference image of the scene at a reference viewpoint, an interest area of the scene being included in the reference image and a reference position ($x_0$,$y_0$) being associated with the interest area in a reference local coordinate system of the capture device. For a current image of the scene at a current viewpoint, the method identifies the interest area of the scene in the current image, determines, in the reference local coordinate system, a current position ($x_c$,$y_c$) of the interest area identified in the current image, compares the current position with the reference position and provides a capture guidance indicator adapted to guide in relative positioning of the capture device towards the interest area, as a function of results of the comparison between the current position and the reference position.

20 Claims, 3 Drawing Sheets (51) Int. Cl.
*H04N 5/235* (2006.01)
*G06K 9/00* (2006.01)
*G06K 9/46* (2006.01)
*H04N 13/221* (2018.01)

(52) U.S. Cl.
CPC ......... *H04N 5/2355* (2013.01); *H04N 5/2356* (2013.01); *H04N 5/23212* (2013.01); *H04N 5/23216* (2013.01); *H04N 5/23222* (2013.01); *H04N 5/23293* (2013.01); *H04N 13/221* (2018.05)

(58) Field of Classification Search
CPC ...... G06T 2207/30232; H04N 13/0022; H04N 13/0203
See application file for complete search history.

(56) References Cited

U.S. PATENT DOCUMENTS

| | | |
|---|---|---|
| 2012/0002019 A1 | 1/2012 | Hashimoto |
| 2013/0038701 A1 | 2/2013 | Hung et al. |
| 2013/0107020 A1 | 5/2013 | Hashimoto |
| 2013/0141524 A1 | 6/2013 | Karunamuni et al. |
| 2013/0148903 A1* | 6/2013 | van Zwol ............ G06K 9/6211 382/224 |
| 2013/0222633 A1 | 8/2013 | Knight et al. |
| 2014/0028791 A1 | 1/2014 | Han et al. |
| 2014/0118483 A1 | 5/2014 | Rapoport et al. |
| 2016/0125267 A1* | 5/2016 | Goldman ............. G06K 9/6211 348/47 |
| 2017/0086791 A1* | 3/2017 | Chae ..................... A61B 8/469 |

* cited by examiner

Fig. 3C

METHOD FOR OBTAINING LIGHT-FIELD DATA USING A NON-LIGHT-FIELD IMAGING DEVICE, CORRESPONDING DEVICE, COMPUTER PROGRAM PRODUCT AND NON-TRANSITORY COMPUTER-READABLE CARRIER MEDIUM

This application claims the benefit, under 35 U.S.C. § 119 of European Patent Application No. 15305661.9, filed Apr. 30, 2015.

1. TECHNICAL FIELD

The field of the disclosure relates to light-field imaging. More particularly, the disclosure pertains to technologies for acquiring and processing light-field data.

More specifically, the disclosure relates to a method and device for obtaining light-field data with a conventional (non-light-field) image capture device. Conventional image capture device is defined herein as any imaging device capable of capturing two-dimensional images of a scene from a single viewpoint, as opposed to light-field capture devices which are able to capture light-field data once from several viewpoints.

2. BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional image capture devices render a three-dimensional scene onto a two-dimensional sensor. During operation, a conventional capture device captures a two-dimensional (2-D) image representing an amount of light that reaches each point on a photosensor (or photodetector) within the device. However, this 2-D image contains no information about the directional distribution of the light rays that reach the photosensor (may be referred to as the light-field). Depth, for example, is lost during the acquisition. Thus, a conventional capture device does not store most of the information about the light distribution from the scene.

Light-field capture devices (also referred to as "light-field data acquisition devices") have been designed to measure a four-dimensional (4D) light-field of the scene by capturing the light from different viewpoints of that scene. Thus, by measuring the amount of light traveling along each beam of light that intersects the photosensor, these devices can capture additional optical information (information about the directional distribution of the light rays) for providing new imaging applications by post-processing. The information acquired/obtained by a light-field capture device is referred to as the light-field data. Light-field capture devices are defined herein as any devices that are capable of capturing light-field data.

Light-field data processing comprises notably, but is not limited to, generating refocused images of a scene, generating perspective views of a scene, generating depth maps of a scene, generating extended depth of filed (EDOF) images, generating stereoscopic images, and/or any combination of these.

There are several types of light-field capture device.

A first type of light-field capture device, also referred to as "plenoptic device", uses a microlens array placed between the image sensor and the main lens, as described in the documents US 2013/0222633 and WO 2013/180192. Such device is capable of sampling light distribution and light directions in a field of light rays emanating from the scene. On the basis of this information, a useful application is that images can be collected with increased focal depth and/or digitally refocused. Moreover, there are several algorithms to generate images from raw light-field data at different focal planes and to estimate depth of field of the scene at multiple positions. However, plenoptic devices suffer from the following disadvantage: the number of microlenses used therein intrinsically limits the effective resolution of these plenoptic devices. The spatial and angular information acquired by the device are therefore limited.

Another type of light-field capture device uses a plurality of independently controlled cameras each with its own lens and image sensor, or an array of cameras that image onto a single shared image sensor (see for example the document WO 2014149403). However, these devices require an extremely accurate arrangement and orientation of cameras, which make their manufacturing often complex and costly.

Another way to capture light-field data is to acquire, by the use of a conventional handheld camera, a series of 2-D images of a scene each taking from a different viewpoint, and processing the images thus captured to obtain light-field data. In this technique, the camera is typically moved by a user in different directions of space and operates to sequentially capture of a set of images that can be then combined to obtain light-field data. However, to obtain exploitable light-field data, the user must, during capture, accurately orient the camera towards a same interest point of the scene, whatever the viewpoint adopted. But there is no means that enables the user to capture a set of images suited for acquiring reliable light-field data. It may be user error resulting in non-exploitable optical information in post-processing.

Thus, it would be interesting to provide a user of a conventional capture device with instructions and guidance to facilitate/ease proper capture operation of the capture device for acquiring images allowing obtaining light-field data.

3. SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A particular embodiment of the invention proposes a method for obtaining light field data of a scene from a sequence of images of the scene, each image being captured at a different viewpoint by a use of a non-light-field image capture device, the method being executed by said non-light-field image capture device and comprising:

obtaining a reference image of the scene at a reference viewpoint, an interest area of the scene being comprised in the reference image and a reference position being associated with said interest area in a reference local coordinate system of said capture device;

for a current image of the scene at a current viewpoint:

identifying said interest area of the scene in the current image;

determining, in the reference local coordinate system, a current position of said interest area identified in the current image;

comparing the current position with the reference position;

providing a capture guidance indicator adapted to guide in relative positioning of the capture device towards the interest area, as a function of results of the comparison between the current position and the reference position.

Thus, the invention provides a method for facilitating the acquisition of light field data using a conventional (non-light-field) image capture device. The principle of the invention is to give a capture guidance indicator to a user to guide positioning of the capture device in a manner that will enable capture of a plurality of images of the scene suited for being exploited as light field data. To obtain light field data, whatever the viewpoint adopted by the user, the capture device needs to be oriented toward the same interest area of the scene while moving the capture device. To that end, the method according to the invention comprises allocating a reference position to an interest area of the scene in a reference local coordinate system and comparing that reference position with a current position of the interest area identified in the current image so as to provide feedback to the user enabling him to properly adjust relative position of its device towards the interest area for capturing the current image, as a function of the comparison. Such a method thereby improves the capture process. The light field data are obtained by processing a sequence of images comprising the reference image and at least one current image.

According to a particular feature, the method further comprises capturing said current image when a distance between the current position and the reference position is below a predetermined threshold.

This allows a capture of the scene whether the distance between the current position and the reference position is below a particular tolerance threshold. In this way, this ensures proper image capture operation for acquiring quality light-field data using a conventional capture device. It should be noted that the action of capturing can be either automatic or manual. Said distance can be computed from a calculation belonging to the group comprising:

a Euclidian distance calculation;
a Canberra distance calculation;
a Manhattan distance calculation;
a Minkowski distance calculation.

According to a particular feature, said interest area is identified in the reference and current images by carrying out:

a phase difference detection type autofocus operation; and/or
a contrast detection type autofocus operation.

Thus, the invention takes advantage of the device's autofocus function(s) to continuously identify an interest area in the scene in the image formed on the device's sensor. The autofocus function(s) is based on algorithms which decide where in the field of view to focus.

According to a particular feature, in said obtaining a reference image, said interest area is identified using a set of at least one autofocus sensor, each autofocus sensor having a given position in the reference local coordinate system, and wherein the reference position is associated with the given position of said at least one autofocus sensor in the reference local coordinate system.

Thanks to one or several autofocus sensors (also referred to as "collimators"), the device automatically locks the focus on an interest area of the scene, thereby tracking in continuous that interest area in the image formed on the image sensor f the device. Autofocus sensors, for example represented by squares in a viewing window (viewfinder or display panel), can be distributed in a predetermined arrangement which depends on the autofocus system integrated in device and the autofocus mode set by the user for the capture of the sequence of images.

In an example, only on autofocus sensor can be activated for identifying an interest area. The reference position associated with said interest area is then the position of said autofocus sensor in the reference local coordinate system. This mode is appropriate for small subjects of the scene.

In another example, a plurality of autofocus sensors can be activated for identifying an interest area. In that case, the reference position associated with said interest area is the position of each activated autofocus sensor or the geometric centre of the set of activated autofocus sensors (such as barycentre for example) in the reference local coordinate system. This mode is appropriate for large subjects of the scene.

According to a variant, said interest area is identified in the reference and current images by executing a feature detection operation based on a scale invariant feature transform.

The scale invariant feature transform (SIFT) is a feature detection algorithm used for finding correspondences between parts of images thereby allowing to detect and identify one or several object(s) or interest area(s) in several images.

According to a particular feature, the method comprises obtaining inertial data provided by a reference inertial unit comprised in said capture device.

Thus the user can use these additional data to enhance the positioning accuracy of the device during capture process. Indeed, the inertial data enable to know the relative position and orientation of the device in relation to a local referential.

According to a particular feature, the method further comprises obtaining global positioning system data by a Global Positioning System (GPS) unit comprised in said capture device.

These additional data can be used in the light-field data processing.

According to a particular feature, obtaining the reference image comprises obtaining a set of reference sub-images successively captured with different exposure parameters and wherein capturing the current image comprises obtaining a set of current sub-images successively captured with different exposure parameters.

This enables to obtain, for each viewpoint captured of the scene, high dynamic range imaging information.

According to a particular feature, the method further comprises: for said set of reference sub-images:

aligning reference sub-images successively captured between them as a function of at least one feature-point identified in said set of reference sub-images;

fusing said aligned reference sub-images to obtain a reference High-Dynamic-Range image;

and for said set of current sub-images:

aligning said current sub-images successively captured between them as a function of at least one feature-point identified in said set of current sub-images;

fusing said aligned current sub-images to obtain a current High-Dynamic-Range image.

Thus the method provides steps for compensating misalignments caused by any movement of the device in case of sub-images successively captured to obtain high dynamic range imaging information.

The method can also provide a process for compensating for objects moving in the scene between consecutive sub-images in order to avoid ghosting artefacts during the fusion process.

According to a particular feature, said set of reference sub-images successively captured comprises N sub-images, with $2 \leq N \leq 5$ and wherein said set of current sub-images successively captured comprises M sub-images, with $2 \leq M \leq 5$.

According to a particular feature, the capture guidance indicator is an arrow image indicating via a man-machine interface the direction in which the capture device has to be positioned for capturing the current image of the scene.

The man-machine interface may be of different types. For example, it can be an electronic viewfinder or a visual display panel.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention proposes a non-light-field Image capture device configured to obtain light field data of a scene from a sequence of images of the scene, each image being captured at a different viewpoint. Such a non-light-field image capture device comprises:

obtaining unit configured to obtain a reference image of the scene at a reference viewpoint and at least one current image of the scene at a current viewpoint, an interest area of the scene being comprised in the reference image and a reference position being associated with said interest area in a reference local coordinate system of said capture device identifying unit configured to identify said interest area of the scene in a current image of the scene at a current viewpoint;

determining unit configured to determine, in the reference local coordinate system, a current position of said interest area identified in the current image;

comparing unit configured to compare the current position with the reference position;

providing unit configured to provide a capture guidance indicator adapted to guide in relative positioning of the capture device towards the interest area, taking into account results provided by the comparison unit.

Advantageously, the device comprises means for implementing the steps performed in the obtaining method as described above, in any of its various embodiments.

4. LIST OF FIGURES

Other features and advantages of embodiments of the invention shall appear from the following description, given by way of an indicative and non-exhaustive examples and from the appended drawings, of which.

5. DETAILED DESCRIPTION

In all of the figures of the present document, identical elements and steps are designated by the same numerical reference sign.

Figure 1:
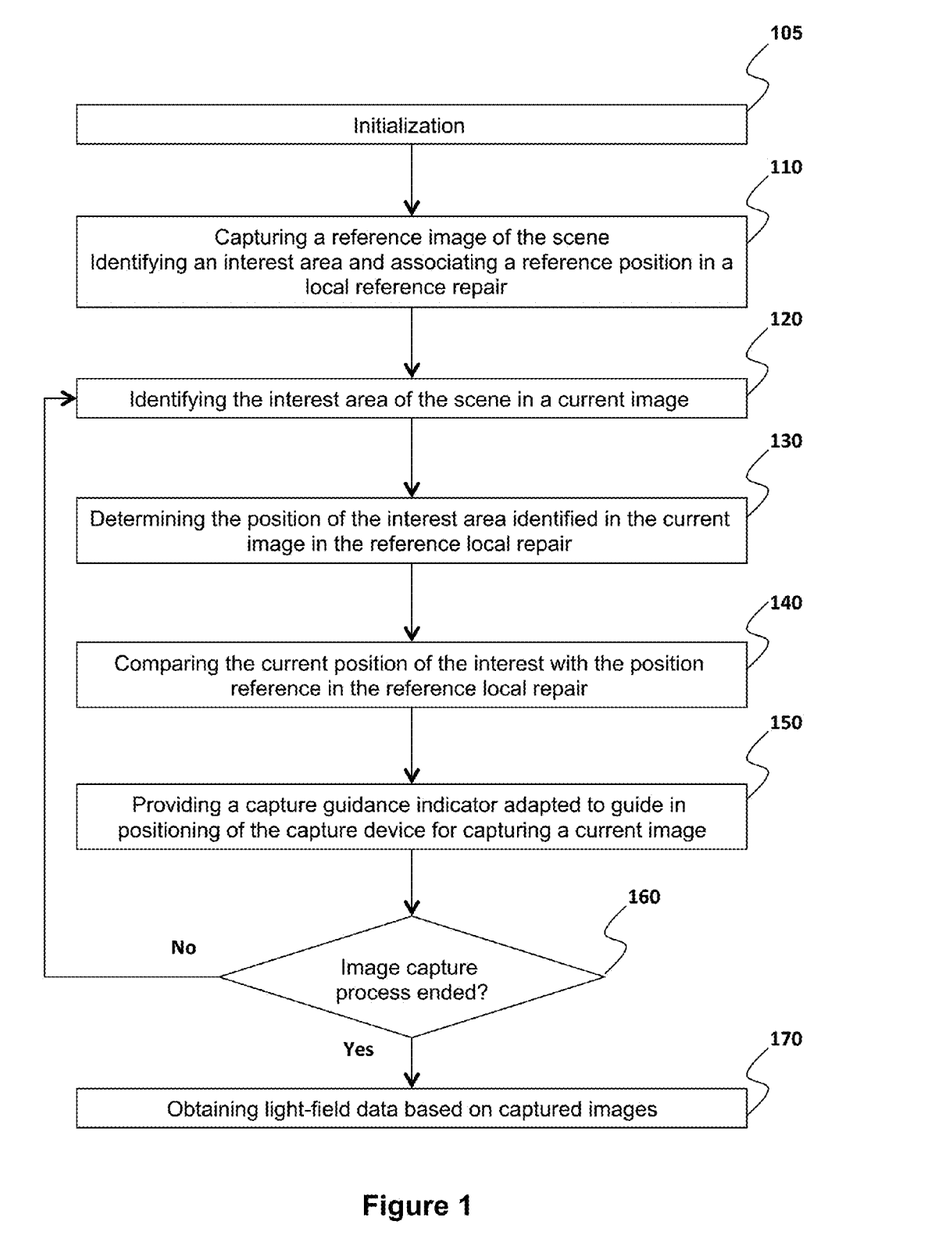
FIG. 1 is a flowchart of a particular embodiment of the method for obtaining light-field data of the invention.

FIG. 1 depicts a method for obtaining light-field data according to a particular embodiment of the invention. This method is carried out by a conventional (non-light-field) device 100, the principle of which is described in detail below in relation with FIG. 4.

It is pointed out here that a conventional image capture device is defined herein as any imaging device capable of capturing two-dimensional images of a scene or an object from a single viewpoint.

The general principle of the invention is to help the user of a conventional image capture device to best adjust the positioning of his device relative to an object or scene of interest, to acquire a sequence of 2-D images suited for obtaining light-field data corresponding to the object or scene of interest. The user moves the device in different directions of space and operates to capture of a sequence of images so as to capture images at different viewpoints, which can be combined to obtain light-field data.

It should be noted that the capture process described here below can be performed by the user either by a continuous capture of a set of contiguous images obtained by sweeping or scanning the scene of interest (e.g. "video mode" or "sweeping mode") or by a discretised (non-continuous) capture of a set of images in different location in space ("shooting mode").

When a user wishes to acquire light-field data, he places the device 100 in front of a scene to be captured and turns on the power supply switch to power on the device 100 and puts it on light-field capture mode. This corresponds to step 105 and enables the algorithm of FIG. 1 to be initialized.

At step 110, the user captures a first image of the scene at a first viewpoint. This first image defines a reference image throughout the algorithm/method.

Figures 2A, 3A:
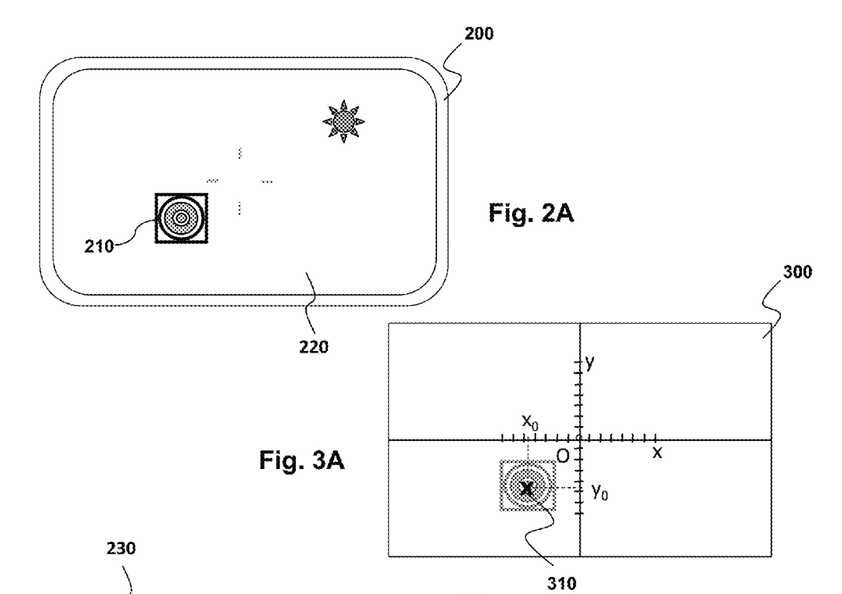
FIGS. 2A-2C depict an example of user interface provided on the display of the image capture device for facilitating light-field data capture according to a particular embodiment of the invention.
FIGS. 3A-3C depict an example of local reference coordinate system used for implementing the method according to a particular embodiment of the invention.
Figures 2B, 3B:
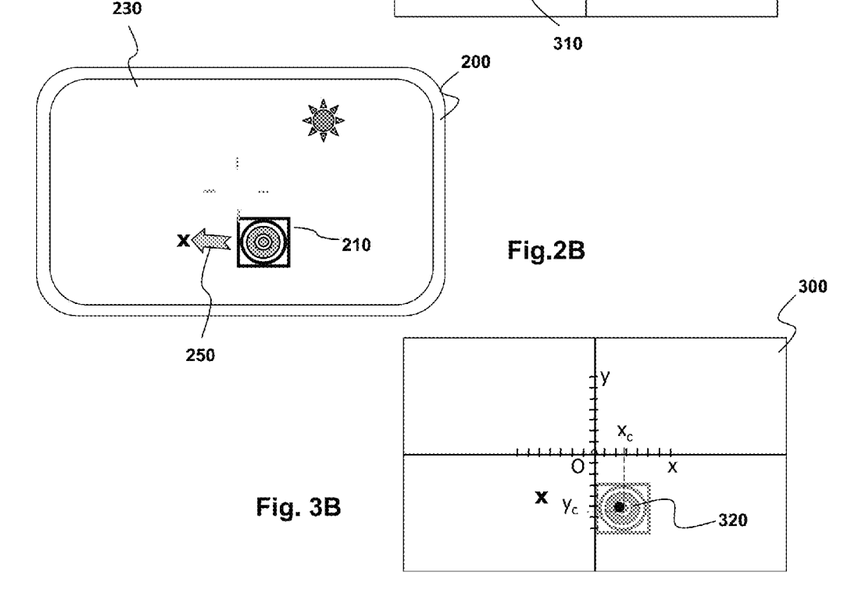

To view the images captured during the capture process, the device 100 equipped with a man/machine interface. The man/machine interface may be of different types. FIGS. 2A and 2B illustrates the use of an electronic viewfinder 200, generally available in capture devices, to view the scene or the object to be captured (i.e. the scene or the object as formed on the image sensor). FIG. 2A shows a reference image 220 and FIG. 2B a current image 230 displayed in the electronic viewfinder 200 of the device 100.

When the reference image is captured, the device 100 identifies the object 210 as the area of interest of scene. This area of interest 210 represents the "reference pivot point" of the scene around which the capture of the sequence of images must be performed to acquire desired light-field data. The device 100 then associates the identified object 210 with a reference position in a reference local coordinate system of the device 100. An example of reference local coordinate system 300 corresponding the reference image is illustrated in FIG. 3A. It is an orthonormal reference coordinate system defined in the focal place of the device's photosensor. The central point "O" of the coordinate system 300 corresponds to the centre of the device's focal plane, i.e. the point of passage of the optical axis of the optical system associated with the camera. The reference position 310 allocated to the object 210 corresponds to the coordinates $(x_0, y_0)$ of the centre of the object 210 in the reference coordinate system 300.

Figures 2C, 3C:
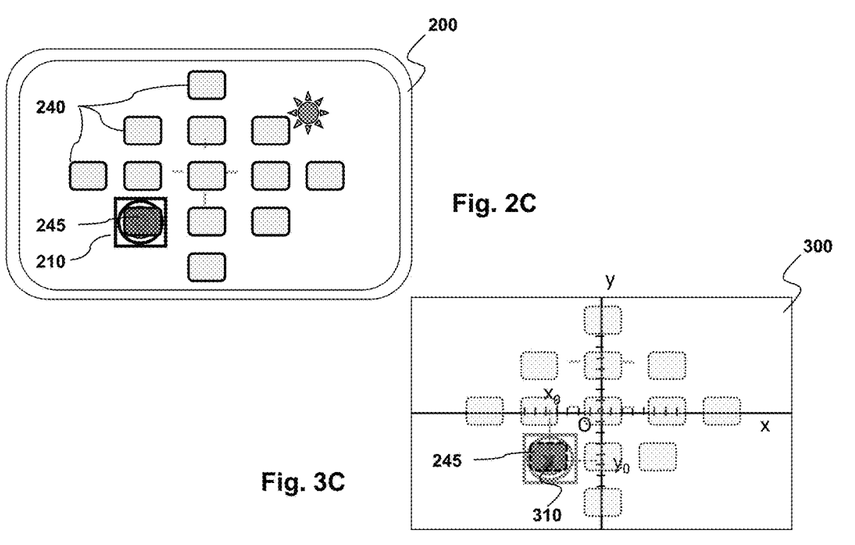

This object of interest 210 can be identified according to different ways. For example, as illustrated in FIGS. 2C and 3C, the device 100 uses the autofocus system implemented by an electronic focusing module within the device 100. The device 100 uses the autofocus mechanism to decide on which area in the field of view to focus, the focused area being identified in the image as the interest area of the scene to be taken into account for further steps of the method. Thus, the method takes advantage of the autofocus mechanism implemented by the device 100 to define which area of the scene is to be taken into account for the acquisition of the different images. The device 100 thus locks on the object of interest 210 and maintains the focus on this object 210 as if this object was a known target to track in subsequent images to be captured.

This identifying step is carried out by means of an array of collimators (autofocus sensors) 240. Each collimator has an associated position in the reference local coordinate system 300. Thus, the reference position associated with the interest object 210 corresponds to the position of the collimator having been used to focus on the interest object 210. As is the case on FIG. 3C where the highlighted collimator 245 has been used to focus on the object of interest 210, the reference position $(x_0, y_0)$ corresponds to the position of that collimator 245 in the reference local coordinate system 300.

When a set of collimators have been used to focus on the object of interest 210, the reference position corresponds, for example, to the barycentre of points associated with said plurality of collimators in the reference local coordinate system 300.

The autofocus mechanism used can be based on various techniques extensively described in the technical literature. For example, an object of interest can be identified by carrying out a phase difference detection type autofocus or a contrast detection type autofocus or a combination thereof.

The number of collimators illustrated here is just a non-limitative example for the purposes of pedagogical description. Of course, a smaller or greater number of collimators can be used without departing from the scope of the invention. In order to cover a greater field of view, a greater number of collimators should be necessary for example. In addition, different autofocus modes can be proposed by the focusing module. In one exemplary embodiment, to capture an image, the device 100 performs a focus by automatically selecting the collimator or set of collimators it deems necessary to focus. In another exemplary embodiment, the device 100 performs an automatic focus using an autofocus or a set of at least one collimator previously chosen by the user.

During the image capture process, after the reference image has been captured, the user moves the device 100 relative to the object of interest 210 in one or several directions of space, to acquire light-field data corresponding to the object of interest 210. An essential condition is that the device 100 always points towards the object of interest 210 whatever the viewpoint adopted by the user during the capture process.

The user can move the device 100 in vertical (i.e. from up to down, or down to up), in horizontal (in a left to right direction or a right to left direction), or a combination thereof, while pointing towards the object of interest 210. It should be noted that a movement of the device in depth (in a forward to back direction or a forward to forward direction) is also a possibility not to exclude in combination with the above vertical and/or horizontal movements but it is not necessary basically for obtaining light-field data. The desired main acquisition must be performed in lateral movement around the object of interest 210. For example, a scan direction comprises a scan path along a horizontal axis ("x-axis") in the left to right direction while pointing towards the object of interest 210. Thus the scan direction comprises a rotational component, typically around a vertical axis ("y-axis"), that is not co-linear with the plane formed by the x-axis and y-axis.

At step 120, for a current image captured at a given viewpoint, the device 100 will then identify the interest object previously identified in step 110, thanks to the autofocus mechanism implemented by the electronic focusing module of the device 100. This step 120 is executed upon detection of a change of state of the device 100 (e.g. change of position or angle orientation of the device). An example of a current image is represented via the viewfinder 200 illustrated in FIG. 3A.

At step 130, the device 100 determines, in the reference local coordinate system 300, the position of the interest area identified in the current image (coordinates $(x_c, y_c)$), hereafter called current position. FIG. 3B represents the reference local coordinate system 300 corresponding to the current image. The element 320 is the current position of the object of interest 210 determined by the device 100 in the coordinate system 300. It appears that, after moving the device 100, the interest objet 210 is no longer at the same position in the viewfinder 200. So it is necessary to indicate to the user the direction in which he must move the device 100 to acquire quality light-field data.

At step 140, the device 100 compares the current position $(x_c, y_c)$ of the object of interest 210 with the reference position $(x_0, y_0)$.

At step 150, the device 100 then provides a capture guidance indicator 250 adapted to guide the positioning of the device 100 in such way that the current position $(x_c, y_c)$ 320 matches with the reference position $(x_0, y_0)$ 310. Thus, as a function of results of step 140, a capture guidance indicator 250 is provided to the user, for example on back screen of the viewfinder 200, urging him to readjust the relative position of the device 100 during the capture process in respect to the object of interest of the scene. The capture guidance indicator 250 illustrated in FIG. 2B is an arrow indicating the direction in which the object of interest 210 shall be positioned in the current image (arrow pointing to the left). Typically, the arrow 250 is provided between the reference position and the current position previously determined by the device 100.

Alternatively, it can be envisioned to provide an arrow pointing out the direction in which the device 100 shall be oriented in order to keep the interest object 210 at the same position in current images while sweeping the device (arrow pointing to the right).

The capture guidance indicator 250 can be an image other than a straight arrow, such as a curved arrow (clockwise or counterclockwise rotation), a double-arrow, or other symbol used to point out or indicate a direction.

In addition, the capture guidance indicator 250 can be variably coloured or can have a variable size, as a function of the comparing step 140. For example, the man-machine interface 200 can provide a capture guidance indicator whose the size varies as a function of the distance between the reference and current positions in the local reference coordinate system 300, when the device 100 is being moved: the smaller the guidance indicator, the more accurate will be the positing of the device 100 relative the interest object 210. The indicator can disappear when the reference and current positions matches perfectly or when a distance computed between these two positions is below a predetermined tolerance threshold, hereafter noted T. A distance is a numerical description of how far apart positions are.

According to a particular approach, the predetermined tolerance threshold T can be set on the basis of a Euclidian distance calculation. Consider the photosensor of the device 100 has W pixels in width and H pixels in height, and let define the number N as following: N=min(W,H). Thus, if the devices comprises a 24 Mega Pixels photosensor with W=6000 pixels and H=4000 pixels, for example, the number N is equal to 4000 pixels. The predetermined tolerance threshold T can be set, for example, at 2% of the number N, i.e. T=0.02×N.

Consider now two points A and B, A corresponding to the reference position with coordinates $(x_0, y_0)$ and B corresponding to the current position with coordinates $(x_c, y_c)$ in a orthonormal coordinate system. The Euclidian distance between points A and B, $d_{AB}$, is given by the following formula:

$$d_{AB} = \sqrt{(x_c - x_0)^2 + (y_c - y_0)^2}$$

The device 100 shall then compare the current Euclidian distance $d_{AB}$ with the predetermined tolerance threshold T (which is equal here to 0.02×N). As long as the current Euclidian distance $d_{AB}$ is equal or more than the predetermined tolerance threshold T ($d_{AB} \geq T$), the visual indicator 250 is maintained. When the current distance $d_{AB}$ computed by the device 100 is below the predetermined tolerance threshold T ($d_{AB} < T$), the visual indicator 250 disappears.

The particular case where the current distance $d_{AB}=0$ means that the reference and current positions perfectly coincide.

Of course other well-known distance calculations can be implemented without departing from the scope of the invention. It can be envisioned, for example, to base calculation from a Manhattan distance, a Canberra distance or a Minkowski distance. It can be envisioned, for example, to base calculation from the following formula:

$$d_{AB} = \max(|x_c - x_0|, |y_c - y_0|)$$

with a predetermined tolerance threshold set, for example, at 0.02×N.

Alternatively, it can be envisioned to use a sighting pattern as a capture guidance indicator. The sighting pattern shall be provided at a fixed position on the back screen of the viewfinder 200 corresponding to the reference position in the reference coordinate system 300, enabling the user to adjust the position of the device 100 in a manner that the object of interest 210 matches the sighting pattern. This sighting pattern is for example red when the device 100 is not accurately positioned relative to the object of interest 210 and green when the position of the device 100 relative to the object of interest 210 is adjusted (object 210 included in or overlapped the sighting pattern) and makes it possible to obtain light-field data in optimum conditions at the current viewpoint.

Further the visual capture guidance indicator described above in any of its various embodiments, it can be envisioned to use a speaker integrated into the device 100 which can send out a sound signal with a clock rate that varies according to the distance between as a function of the distance between the reference and current positions in the local reference coordinate system 300, when the device 100 is being moved: the faster the clock rate of the sound signal, the more accurate will be the positioning of the camera 100 relative to the object of interest 210. A continuous sound signal reflects an adequate positioning of the device 100 at the current viewpoint. Conversely, a sound signal with a slow clock rate reflects a wrong positioning of the device 100 (unacceptable device orientation relative to the object of interest 210).

In a particular embodiment, the device 100 can be configured so as to allow capture of a current image only if the positioning of the device 100 by the user is acceptable for obtaining light-field data, i.e. only if the current position $(x_c, y_c)$ 310 matches the reference position $(x_0, y_0)$ 320. This ensures optimal capture conditions for acquiring light-field data.

A test is next carried out at step 160 to determine whether the image capture process has ended, such as by a user activating a stop of the capture process. Alternatively, the capture process could be ended automatically, such as by the device 100 determining a movement of the device 100 inconsistent with a scan or sweeping capture (for example by detecting a stop of movement of the device for a predetermined duration or significant change of the orientation of the device). If the capture process has ended, then the device 100 goes to step 170 to process the images acquired during the capture process in order to obtain light-field data. Once the images processed, the algorithm/method stops. If the capture process has not ended, then the device 100 goes back to step 120 to reiterate the steps 120 to 160 until the image capture process does end at step 170.

The method can further comprise a step of obtaining inertial data provided by a reference inertial unit 70 comprised in the device 100. Inertial data enable can be used to know the device's relative position during the capture process (latitude, longitude and elevation coordinates) in a local referential, and its orientation (current inclination angle in relation to a local referential). Thanks to these data, it is possible to help the user to correct the inclination of the device 100, for example by displaying an electronic level in the viewfinder and/or on the display panel. For example, an accelerometer or a gyroscope can be used to guide the scanning/sweeping speed of the device 100 (which has to be ideally constant) while maintaining a constant altitude thereof (the inclination of three axes of the inertial unit has to be remain constant as long as possible in relation to the inclination obtained for the reference image). An additional visual indicator can be further displayed to urge the user to adjust, in real time, scanning/sweeping speed of the device 100 as a function of the movement speed of the device 100 determined by the inertial unit 70. Another additional visual indicator can also be displayed to urge the user to adjust, in real time, altitude of the device 100 as a function of the current altitude of the device 100 determined by the inertial unit 70.

In a variant, the capture of each image (reference and current images) according to one embodiment of the disclosure can be associated with global positioning system data (GPS coordinates for example) provided by a GPS unit comprised within said capture device 100.

As well, instead of capturing only one image (reference image or current image) for a given viewpoint, it may be envisaged to obtain a set of reference sub-images successively captured with different exposure parameters (such technique is called a bracketing technique and it belongs to the family of HDR (which stands for "High-Dynamic-Range") techniques). This offers, for each viewpoint captured of the scene, high dynamic range imaging information that can be advantageously used for light-field data processing. Hence, by using the present technique, high-dynamic-range light field data can be obtained with a conventional (non-light-field) image capture device. Therefore, the present technique for obtaining high-dynamic-range light field data can be viewed as an alternative technique of the one described in the document "*High Dynamic Range Image Capture with Plenoptic 2.0 Camera*" by T. Georgiev et al., published in the conference proceedings of Signal Recovery and Synthesis, 2009.

In that context, an aligning of sub-images is necessary to avoid obtaining a blurry HDR images. To that end, it is provides a step of aligning sub-images successively captured between them (also called registration step) as a function of at least one feature-point identified in the set of sub-images. This can be based on a scale-invariant feature transform (SIFT) method employed to search for predefined key-points (or predefined feature-points) in sub-images consecutively captured, before fusing said sub-images to create an HDR image. For example, the method can align captured sub-images assuming that the scene is fixed. This compensates misalignments caused by any movement of the device. Furthermore, the method can comprise a process for compensating for objects moving in the scene between consecutive sub-images in order to avoid ghosting artifacts during the fusion process. This process is carried out before or during the sub-image fusing step. Thus, in addition to prevent image blur caused by device shake, the method according to the invention provides a process able to compensate the objects, within the image, which would move between two successive sub-images.

For example, a number of reference or current sub-images comprises between 2 and 5 ensures the user to have blurry free HDR images.

The method described above is based on an autofocus mechanism to identify and track an object or an area of interest in numerical images. Various methods performing the same function can be envisaged without departing from the scope of the invention, such as methods based on self-correlation computations or scale invariant feature transform (SIFT).

Figure 4:
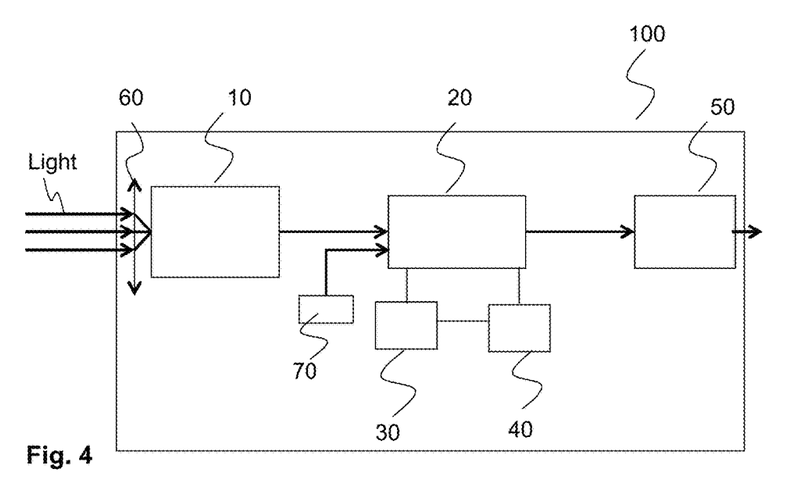
FIG. 4 depicts an example of structure of an image capture device implementing the method according to a particular embodiment of the invention.

Referring now to FIG. 4, we present an example of an image capture device 100 according to a particular embodiment of the invention. The device 100 comprises:
- an image sensor 10, for example using a CCD (charge-coupled device) or CMOS (complementary metal oxide semiconductor) technology;
- a processor 20 capable of executing program code instructions enabling implementation of at least one part of the steps of the algorithms described here below with reference to FIG. 1;
- a non-volatile memory 30, for example a read-only memory (ROM) or a hard disk;
- a volatile memory 40, for example a random access memory (RAM);
- a man/machine interface 50, for example an electronic viewfinder or a touch-screen display panel adapted to view images to be captured ("preview image") or captured images and to guide the user through the device positioning during the capture process;
- an optical objective 60 that can comprise one or more optical lenses;
- a reference inertial unit 70 providing inertial data.

The non-volatile memory 30 is a non-transitory computer-readable carrier medium. It stores executable program code instructions, which are executed by the processor 20 in order to enable implementation of the method described above. Upon initialization, the program code instructions are transferred from the non-volatile memory 30 to the volatile memory 40 so as to be executed by the processor 20. The volatile memory 40 likewise includes registers for storing the variables and parameters required for this execution.

According to a particular embodiment, the steps of the present method can be implemented:
- for step 110, by a capturing (or obtaining) unit configured to capture (or obtain) images by means of the image sensor, an interest area of the scene being identified in the reference image and a reference position being associated with the interest area in the reference local coordinate system;
- for step 120, by an identifying unit configured to identify, in the current image, the object of interest 210 identified in the reference image;
- for step 130, by a determining unit configured to determine, in the reference local coordinate system, a current position of the interest area identified in the current image;
- for step 140, by a comparing unit configured to comparing the current portion and the reference position;
- for step 150, by a providing unit configured to provide a capture guidance indicator adapted to guide in relative positioning of the capture device to the interest area in taking into account results provide by the comparing unit;
- for step 170, by an obtaining unit configured to obtain light-field data from the captured images.

The aforementioned units can be integrated within the processor 20.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit", "module", or "system".

When the present principles are implemented by one or several hardware components, it can be noted that an hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETIS/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

Thus for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

Although the present disclosure has been described with reference to one or more examples, workers skilled in the art will recognize that changes may be made in form and detail without departing from the scope of the disclosure and/or the appended claims.

The invention claimed is:

1. Method for obtaining light field data of a scene from a sequence of images of the scene, each image being captured at a different viewpoint by an image capture device, the method being executed by said image capture device and comprising:

obtaining a reference image of the scene at a reference viewpoint for said image capture device, an interest area of the scene being comprised in the reference image and a reference position being associated with said interest area in a reference local coordinate system of said image capture device;

moving a position of the image capture device to capture a current image of the scene at a current viewpoint of said image capture device; and for the current image of the scene at the current viewpoint of said image capture device:

identifying said interest area of the scene in the current image;

determining, in the reference local coordinate system, a current position of said interest area of the scene identified in the current image;

comparing the current position with the reference position; and providing a capture guidance indicator adapted to guide in relative positioning of the image capture device towards the interest area, as a function of results of the comparison between the current position and the reference position to obtain light field data of the scene from a sequence of images of the scene.

2. Method according to claim 1, further comprising capturing said current image when a distance between the current position and the reference position is below a threshold.

3. Method according to claim 1, wherein said interest area is identified in the reference image and the current image by carrying out at least one of: a phase difference detection type autofocus operation; and/or a contrast detection type autofocus operation.

4. Method according to claim 3, wherein, in said obtaining a reference image, said interest area is identified using a set of at least one autofocus sensor, each autofocus sensor having a given position in the reference local coordinate system, and wherein the reference position is associated with the given position of said at least one autofocus sensor in the reference local coordinate system.

5. Method according to claim 1, wherein said interest area is identified in the reference image and the current image by executing a feature detection operation based on a scale invariant feature transform.

6. Method according to claim 1, further comprising obtaining inertial data provided by a reference inertial unit of said capture device.

7. Method according to claim 1, further comprising obtaining global positioning system data by a Global Positioning System unit of said image capture device.

8. Method according to claim 1, wherein obtaining the reference image comprises obtaining a set of reference sub-images successively captured with different exposure parameters and wherein capturing the current image comprises obtaining a set of current sub-images successively captured with different exposure parameters.

9. Method according to claim 8, comprising: for said set of reference sub-images: aligning reference sub-images successively captured between them as a function of at least one feature-point identified in said set of reference sub-images; fusing said aligned reference sub-images to obtain a reference High-Dynamic-Range image; and for said set of current sub-images: aligning said current sub-images successively captured between them as a function of at least one feature-point identified in said set of current sub-images; fusing said aligned current sub-images to obtain a current High-Dynamic-Range image.

10. Method according to claim 8, wherein said set of reference sub-images comprises N sub-images, with $2 \leq N \leq 5$ and wherein said set of current sub-images comprises M sub-images, with $2 \leq M \leq 5$.

11. Method according to claim 1, wherein the capture guidance indicator is an arrow image indicating via an interface a direction for positioning the image capture device to capture the current image of the scene.

12. Computer program product comprising program code instructions for implementing the method according to claim 1, when said program is executed on a computer or a processor.

13. A non-transitory computer-readable carrier medium storing a computer program product according to claim 12.

14. An image capture device configured to obtain light field data of a scene from a sequence of images of the scene, each image being captured at a different viewpoint, wherein said image capture device comprises:
   an obtaining unit configured to obtain a reference image of the scene at a reference viewpoint and, upon movement of the image capture device to a different position, at least one current image of the scene at a current viewpoint, an interest area of the scene being comprised in the reference image and a reference position being associated with said interest area in a reference local coordinate system of said image capture device;
   an identifying unit configured to identify said interest area of the scene in the at least one current image of the scene the current viewpoint;
   a determining unit configured to determine, in the reference local coordinate system, a current position of said interest area identified in the current image;
   a comparing unit configured to compare the current position with the reference position; and
   a providing unit configured to provide a capture guidance indicator adapted to guide in relative positioning of the image capture device towards the interest area, taking into account results provided by the comparison unit to obtain light field data of the scene from a sequence of images of the scene.

15. The device according to claim 14, wherein said obtaining unit captures said current image when a distance between the current position and the reference position is below a threshold.

16. The device according to claim 14, wherein said identifying unit identifies said interest area in the reference image and the current image by carrying out at least one of: a phase difference detection type autofocus operation; and/or a contrast detection type autofocus operation.

17. The device according to claim 16, wherein, in obtaining the reference image by said obtaining unit, said interest area is identified using a set of at least one autofocus sensor, each autofocus sensor having a given position in the reference local coordinate system, and wherein the reference position is associated with the given position of said at least one autofocus sensor in the reference local coordinate system.

18. The device according to claim 14, wherein said identifying unit identifies said interest area in the reference image and the current image by executing a feature detection operation based on a scale invariant feature transform.

19. The device according to claim 14, wherein obtaining the reference image by said obtaining unit comprises obtaining a set of reference sub-images successively captured with different exposure parameters and wherein capturing the current image comprises obtaining a set of current sub-images successively captured with different exposure parameters.

20. The according to claim 14, the capture guidance indicator is an arrow image indicating via an interface a direction for positioning the device to capture the current image of the scene.

* * * * *